US012017230B2

(12) United States Patent
Sandoval et al.

(10) Patent No.: US 12,017,230 B2
(45) Date of Patent: Jun. 25, 2024

(54) FOOD WASTE DISPOSER WITH GRATING RING

(71) Applicant: INSINKERATOR LLC, Benton Harbor, MI (US)

(72) Inventors: Matthew R. Sandoval, Waukesha, WI (US); Clyde C. Verhoff, Fox Point, WI (US); Charles A. Farago, Kenosha, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 0 days.

(21) Appl. No.: 17/679,740

(22) Filed: Feb. 24, 2022

(65) Prior Publication Data

US 2022/0274119 A1 Sep. 1, 2022

Related U.S. Application Data

(60) Provisional application No. 63/154,384, filed on Feb. 26, 2021.

(51) Int. Cl.
*B02C 18/00* (2006.01)
*B02C 13/28* (2006.01)
*E03C 1/266* (2006.01)

(52) U.S. Cl.
CPC .......... *B02C 18/0092* (2013.01); *B02C 13/28* (2013.01); *E03C 1/2665* (2013.01)

(58) Field of Classification Search
CPC . B02C 18/0092; B02C 18/0084; B02C 23/36; E03C 1/2665
See application file for complete search history.

(56) References Cited

U.S. PATENT DOCUMENTS

| | | | | | |
|---|---|---|---|---|---|
| 2,766,942 | A | | 10/1956 | Lockley et al. | |
| 2,766,944 | A | * | 10/1956 | Lockley | E03C 1/2665 310/91 |
| 2,772,836 | A | | 12/1956 | Gebhart | |
| 3,005,596 | A | * | 10/1961 | Jenkins | E03C 1/2665 241/46.013 |
| 3,105,644 | A | * | 10/1963 | Hedlund | E03C 1/2665 241/275 |
| 3,236,462 | A | * | 2/1966 | Stout | E03C 1/2665 241/245 |
| 3,420,455 | A | * | 1/1969 | Chorney | E03C 1/2665 241/46.016 |

(Continued)

FOREIGN PATENT DOCUMENTS

| | | |
|---|---|---|
| EP | 2372030 | 10/2011 |
| WO | 2017/196797 | 12/2014 |

OTHER PUBLICATIONS

PCT/US2022/107695 International Search Report and Written Opinion of the International Searching Authority dated Jun. 9, 2022 (13 pages).

*Primary Examiner* — Faye Francis
(74) *Attorney, Agent, or Firm* — Amundsen Davis, LLC

(57) ABSTRACT

Grinding mechanisms for food waste disposers, and food waste disposers having grinding mechanisms are disclosed herein. The grinding mechanisms include a stationary grinding ring that includes a plurality of grater teeth, and a rotating shredder plate that includes at least one lug. The at least one lug may have at least a portion that is movable with respect to the top surface of the rotating shredder plate, or may be fin shaped.

20 Claims, 11 Drawing Sheets

(56) References Cited

U.S. PATENT DOCUMENTS

| | | | | |
|---|---|---|---|---|
| 7,337,996 | B2 * | 3/2008 | Hanson | B02C 18/062 241/46.013 |
| 7,665,680 | B2 * | 2/2010 | Anderson | E03C 1/2665 241/296 |
| 7,753,297 | B2 * | 7/2010 | Hanson | B02C 18/062 241/46.013 |
| 7,866,583 | B2 * | 1/2011 | Jara-Almonte | E03C 1/2665 241/DIG. 38 |
| 8,500,050 | B2 * | 8/2013 | Ryder | E03C 1/2665 241/86.1 |
| 8,646,707 | B2 * | 2/2014 | Berger | E03C 1/2665 241/DIG. 38 |
| 8,985,489 | B2 * | 3/2015 | Jara-Almonte | E03C 1/2665 241/46.016 |
| 9,222,246 | B2 * | 12/2015 | VanAssche | B02C 23/00 |
| 2004/0245358 | A1 | 12/2004 | Jara-Almonte et al. | |
| 2007/0075169 | A1 * | 4/2007 | Pan | B02C 18/182 241/46.013 |
| 2008/0302891 | A1 * | 12/2008 | Anderson | E03C 1/2665 29/428 |

* cited by examiner

FOOD WASTE DISPOSER WITH GRATING RING

FIELD OF THE INVENTION

The present technology relates to food waste disposers, and more particularly, to grinding mechanisms for food waste disposers.

BACKGROUND

Food waste disposers are used to comminute food scraps into particles small enough to safely pass through household drain plumbing. Referring to FIG. 1 (Prior Art), a conventional food waste disposer 10 is often mounted to a sink, such as a kitchen sink (not shown), and includes a food conveying section 12, a motor section 14, and a grinding section 16 disposed between the food conveying section and the motor section. The food waste disposer 10 includes a housing 18 that contains the food conveying section 12, the motor section 14, and the grinding section 16. The food conveying section 12 includes an inlet 20 for receiving food waste and water. The food conveying section 12 conveys the food waste to the grinding section 16, and the motor section 14 includes a motor imparting rotational movement to a shaft to operate the grinding section.

The grinding section 16 includes a grinding mechanism that accomplishes the comminution and is typically composed of a rotating shredder plate with lugs and a stationary grind ring.

Referring to FIG. 2 (prior Art), one example of a known grinding section 16 is shown. The illustrated grinding mechanism 22 includes a grinding plate 24 with swivel lugs 26 and a stationary grind ring 28. The grinding plate 24 is mounted to the shaft 30. The stationary grind ring 28, which includes a plurality of notches 32 defining spaced teeth 34, is fixedly attached to an inner surface of a housing 36. In the operation of a food waste disposer having the grinding mechanism shown in FIG. 2, the food waste delivered by the food conveying section to the grinding mechanism 22 is forced by the swivel lugs 38 against the teeth 34 of the stationary grind ring 28. The edges of the teeth 34 grind the food waste into particulate matter sufficiently small to pass from above the grinding plate 24 to below the grinding plate 24 via gaps between the rotating and stationary members. Due to gravity, the particulate matter that passes through the gaps between the teeth 34 drops onto the upper end frame 40 and, along with water injected into the disposer, is discharged through a discharge outlet 42. Size control is primarily achieved through controlling the size of the gap through which the food particles must pass.

SUMMARY OF THE INVENTION

Grinding mechanisms for food waste disposers are disclosed herein.

In accordance with at least one aspect a food waste disposer is provided that includes a housing and a grinding mechanism. The housing bounds: a food conveying section; a motor section comprising a motor that rotates shaft; and a grinding section located between the food conveying section and the motor section. The grinding mechanism is located within the grinding section. The grinding mechanism includes a stationary grinding ring including a plurality of rows of grater teeth, wherein each row of grater teeth has at least one grater tooth. The grinding section also includes a rotating shredder plate attached to the shaft, the rotating shredder plate including at least one lug.

In accordance with another aspect, a grinding mechanism for use in a food waste disposer is provided. The grinding mechanism includes a stationary grinding ring including a plurality of rows of grater teeth, wherein each row of grater teeth has at least one grater tooth. The grinding section also includes a rotating shredder plate that includes at least one lug.

BRIEF DESCRIPTION OF THE DRAWINGS

Specific examples have been chosen for purposes of illustration and description, and are shown in the accompanying drawings, forming a part of the specification. The examples and related components and methods encompassed herein are not limited in their applications to the details of construction, arrangements of components, or other aspects or features illustrated in the drawings. Like reference numerals are used to indicate like components.

DETAILED DESCRIPTION

Food waste disposers of the present technology may be configured to be installed under a sink, such as in a home or other desired location. Generally, food waste disposers of the present technology include a grinding mechanism that has a stationary grinding ring having a plurality of rows of grater teeth. The grinding section also includes a rotating shredder plate that has at least one lug.

Figure 1:
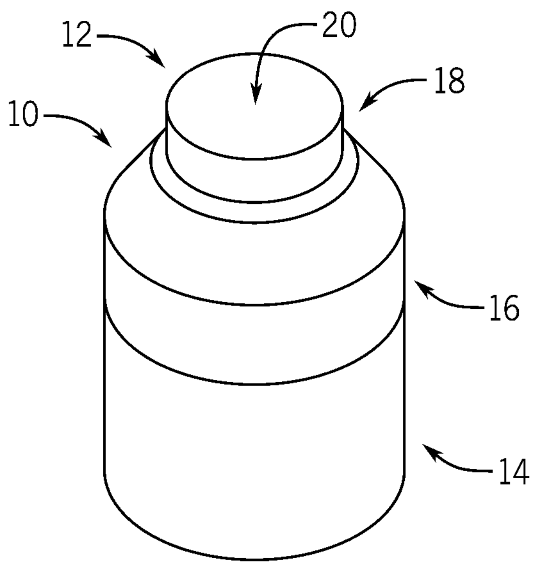
FIG. 1 PRIOR ART
FIG. 1 is an external view of one example of a prior art food waste disposer.
Figure 2:
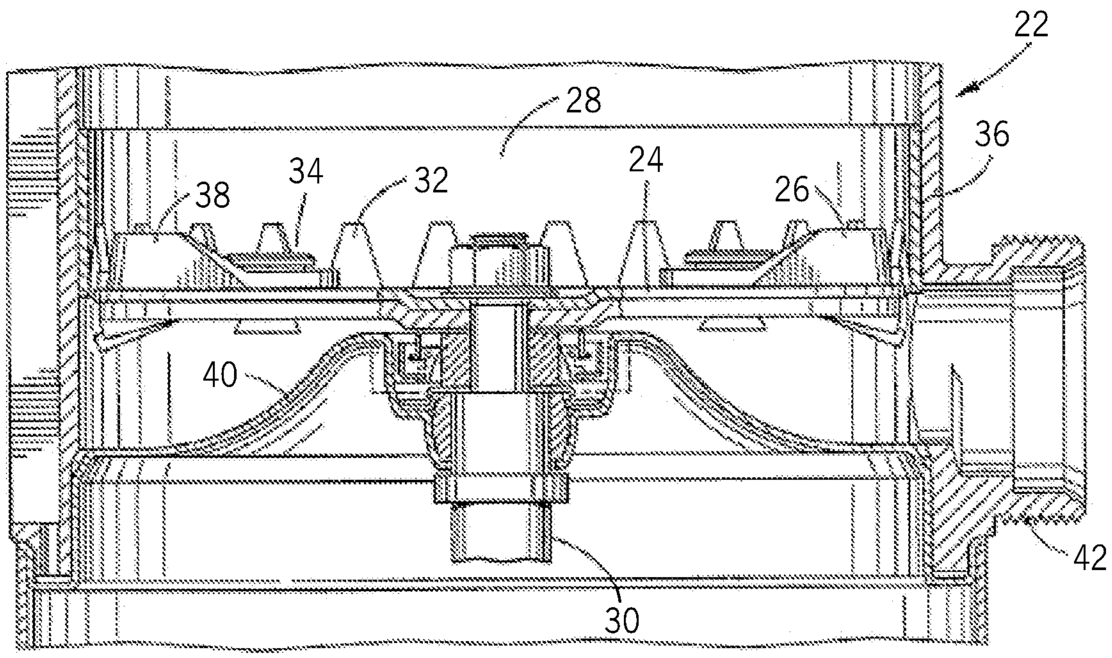
FIG. 2 PRIOR ART
FIG. 2 is a cross-sectional view of a grinding section of the prior art food waste disposer of FIG. 1.
Figure 3:
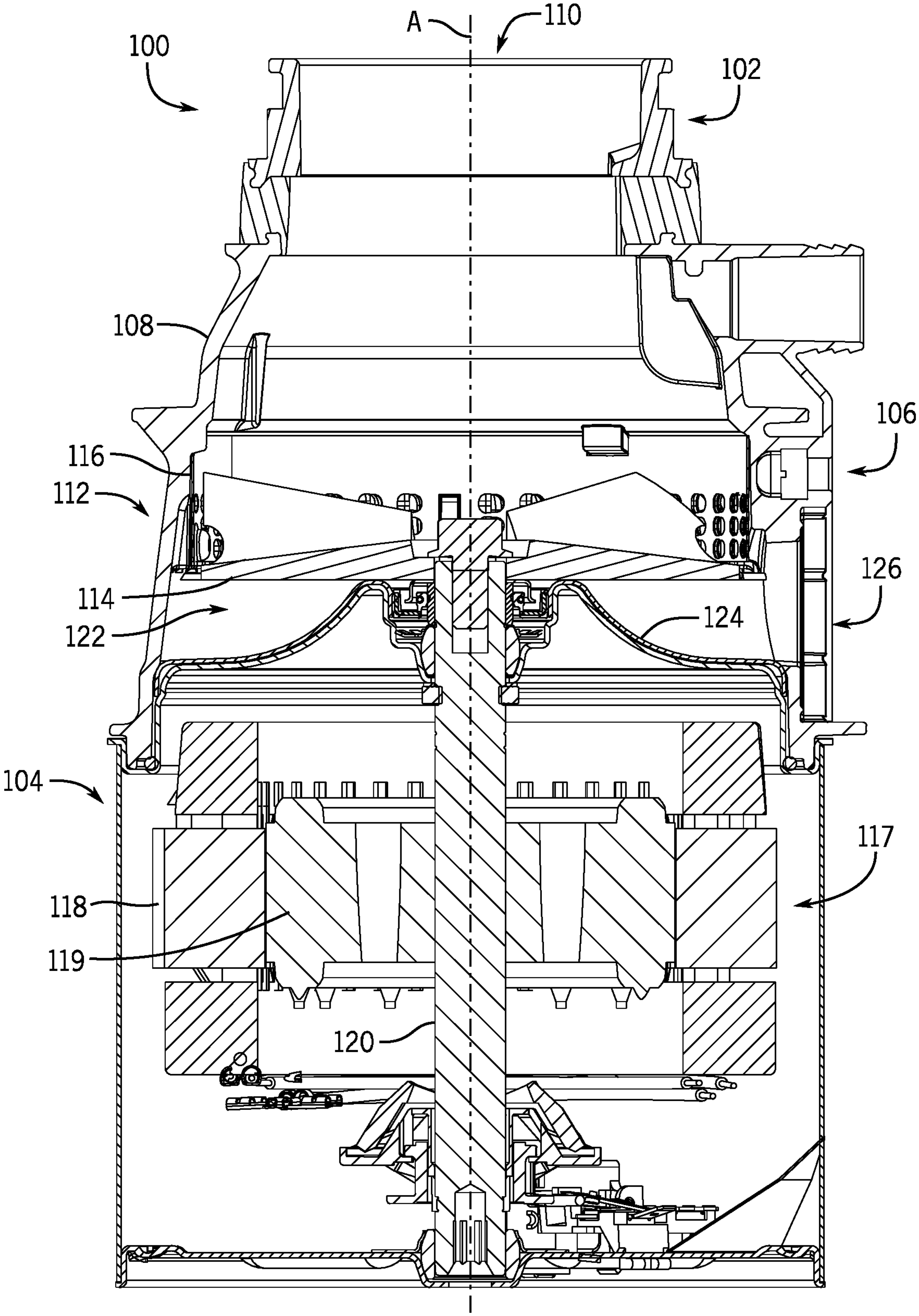
FIG. 3 is a cross-sectional view of one example of a food waste disposer of the present technology.
Figure 4:
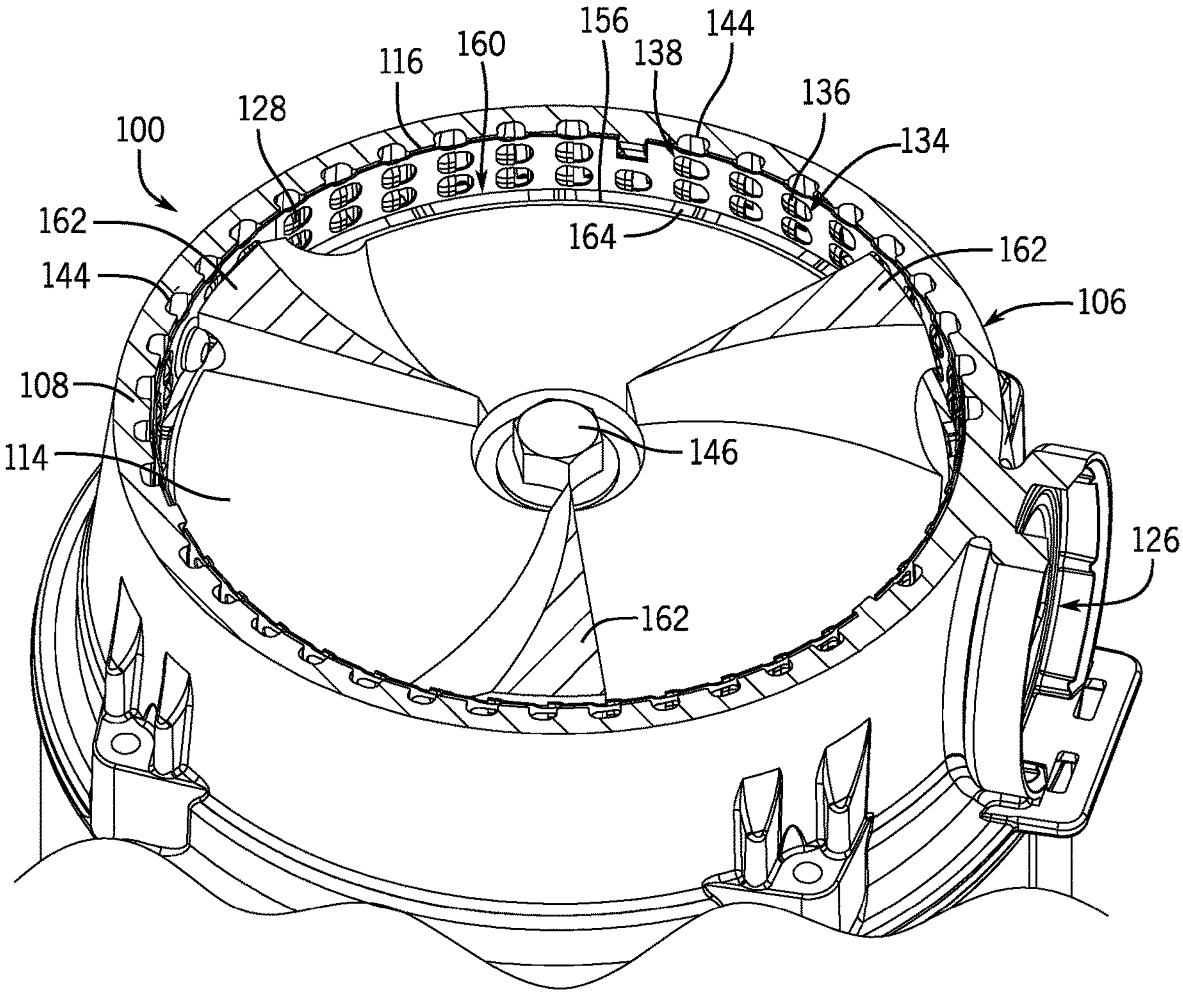
FIG. 4 is a partial perspective view of the food waste disposer of FIG. 3, with the top removed to show the grinding section.

FIGS. 3 and 4 illustrate views of one example of a food waste disposer 100 of the present technology. Food waste disposer 100 includes a food conveying section 102, a motor section 104, and a grinding section 106 disposed between the food conveying section 102 and the motor section 104. The food waste disposer 100 includes a housing 108 that encloses and bounds the food conveying section 102, the motor section 104, and the grinding section 106. The food conveying section 102 includes an inlet 110 for receiving food waste and water. Gravity conveys the food waste from the food conveying section 102 to the grinding section 106. The grinding section 106 includes a grinding mechanism 112 that is configured to comminute food waste into particles small enough to safely pass through the drain plumbing of the location at which the food waste disposer is installed. The grinding mechanism 112 includes a rotating shredder plate 114 and a stationary grinding ring 116. The grinding section 106 also includes a collection area 122 below the grinding mechanism 112. The collection area 122 may have an upper end frame 124 that acts as a floor for the collection area 122. The upper end frame 124 may be made of any suitable material, such as being stamped metal Alternatively, the housing 108 and the collection area 122 may include components that are polymeric, or any other suitable material. The food waste disposer 100 is configured such that comminuted food particles pass downwardly from the grinding mechanism 112 into the collection area 122, and then, along with water injected into the disposer 100, are discharged through a discharge outlet 126.

The motor section 104 includes a motor 117 that rotates a shaft 120. The motor 117 may comprise a stator 118 that imparts rotational movement to a rotor 119 coupled to the shaft 120 to operate the rotating shredder plate 114. The motor 117 can be any suitable type of motor. For example, the motor 117 may be an induction motor or a permanent magnet motor.

Figure 5:
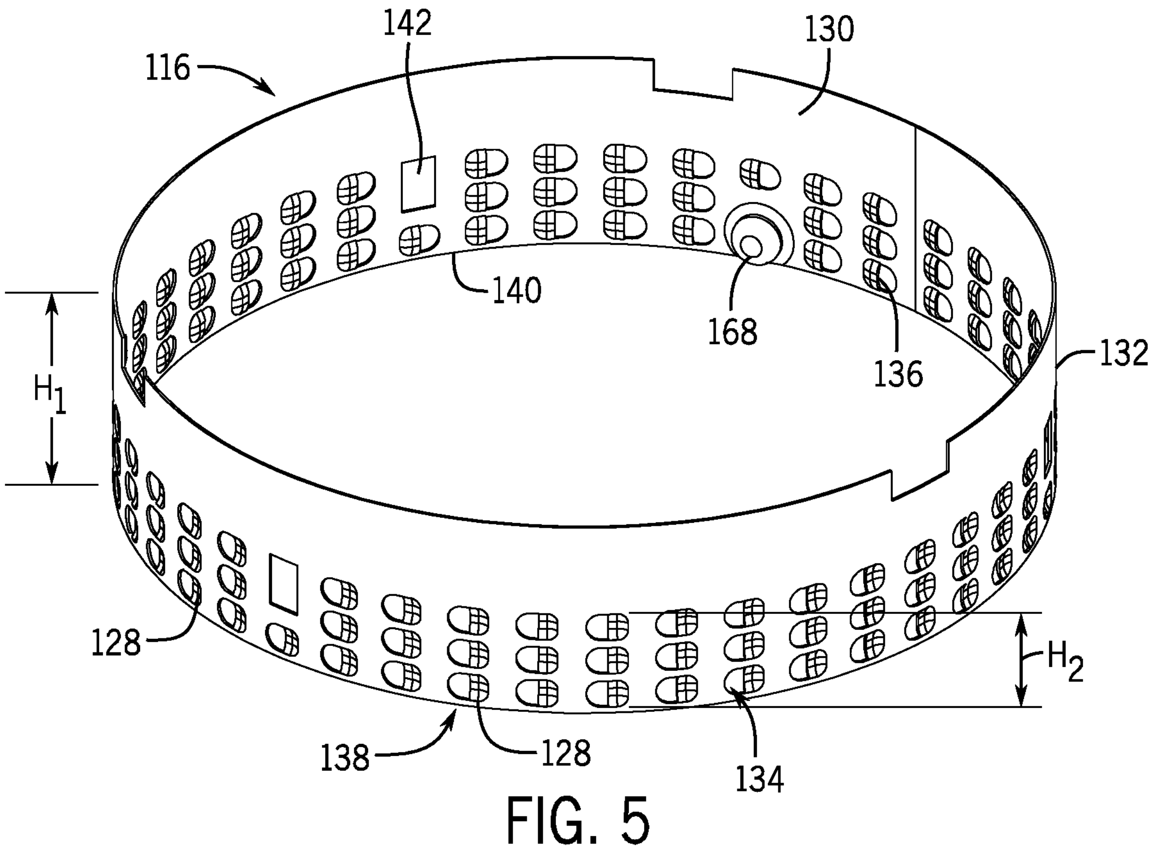
FIG. 5 is a perspective view of one example of a stationary grinding ring that can be used in the food waste disposer of FIG. 3.

Referring to FIGS. 4 and 5, the stationary grinding ring 116 includes an inner surface 130 and an outer surface 132. The stationary grinding ring has a height $H_1$. The stationary grinding ring 116 can include a plurality of grater teeth 128. Each of the grater teeth 128 can include a slot 134 and a raised cutting edge 136. Each slot 134 provides an opening that passes through the stationary grinding ring 116 from the inner surface 130 to the outer surface 132. Each raised cutting edge 136 protrudes inwardly from the inner surface 130 of the stationary grinding ring 116. Each raised cutting edge 136 is configured to cut into, and remove portions of, food waste that is pushed against the stationary grinding ring 116 during operation of the grinding mechanism 112. The grater teeth 128 are each configured such that, during operation of the grinding mechanism 112, portions that are removed from food waste by the raised cutting edge 136 of a grater tooth 128 may pass through the slot 134 of the grater tooth 128.

Referring to FIG. 5, the grater teeth 128 of the stationary grinding ring 116 can be arranged in a plurality of rows 138. Each row 138 can contain one or more, preferably a plurality of, grater teeth 128. Each row 138 can be vertical, or substantially vertical, meaning that each of the grater teeth 128 within each row 138 that has a plurality of grater teeth 128 can be vertically, or substantially vertically, aligned, with respect to a schematic vertical line A that passes through the center of the disposer 100, rather than being vertically offset or staggered with respect to each other of the grater teeth 128 within the same row 138. The number of grater teeth 128 in each row 138 may any suitable number, such as one, two, three, four five, or greater than five. Each row 138 of grater teeth may have a height $H_2$ that is at least a portion of the height $H_1$ of the grinding ring 116, such as up to about half of the height $H_1$, or greater than half of the height $H_1$.

Grater teeth 128 suitable for use in the present technology can be any suitable shape, and can be oriented horizontally (i.e., perpendicularly) or on an angle with respect to the schematic vertical line A, they can also be evenly or unevenly spaced within their given row 138. Grater teeth 128 on any given stationary grinding ring 116 can all be the same shape or can have different shapes. Similarly, grater teeth 128 in any given row 138 on any given stationary grinding ring 116 can all be the same shape or can have different shapes. Additionally, grater teeth 128 within a first row 138 can have the same shape or different shapes than grater teeth 128 within a second row 138. Further, grater teeth 128 on any given stationary grinding ring 116, can all be oriented in the same direction, such as horizontal or angled, or can be oriented in different directions. For example, each of the grater teeth 128 in a first row 138 may be oriented in a first direction, and the grater teeth 128 in a second row 138 may be oriented in a second direction. However, one of ordinary skill in the art will understand that the rotating shredder plate 114 of the grinding mechanism 112 will rotate in a certain direction, such as clockwise or counter-clockwise, and that the grater teeth 128 will tend to be most effective when configured such that the cutting edges 136 are configured and oriented to cut food waste that is moving in the rotation direction of the rotating shredder plate 114.

Figure 6:
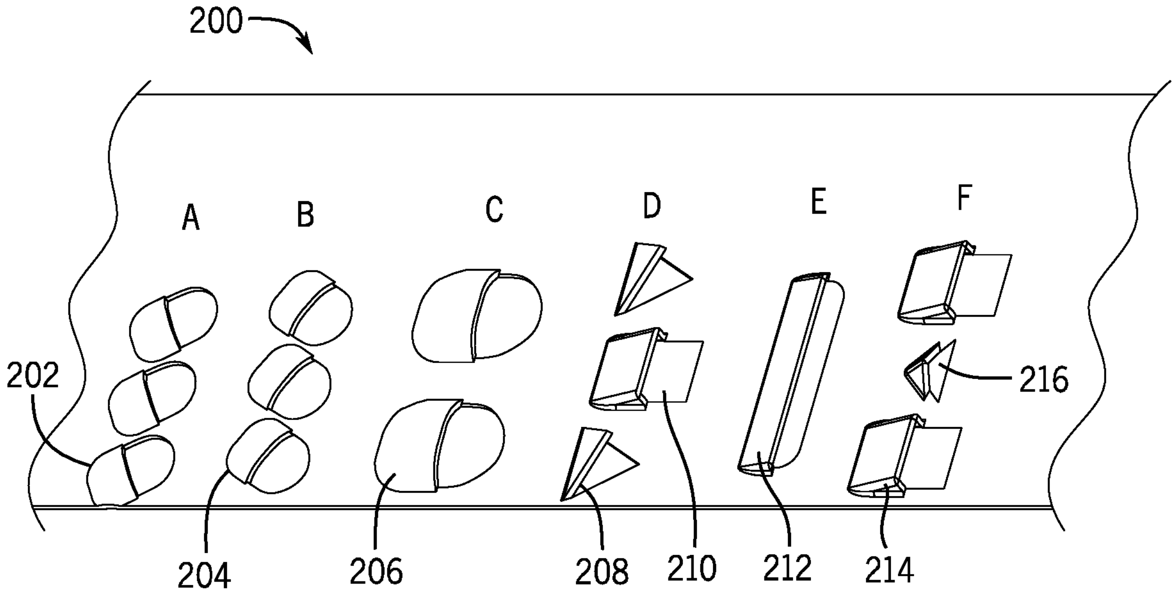
FIG. 6 is a partial view of another example of a stationary grinding ring that can be used in the food waste disposer of FIG. 3.

In FIG. 5, each of the grater teeth 128 has an oblong or generally ovoid shape, and oriented with the length of the grater tooth 128 being horizontal. FIG. 6 illustrates a portion of a stationary grinding ring 200 that contains several possible alternative shapes that can be used for grinding teeth 128. Row A of stationary grinding ring 200 has a plurality of generally ovoid grater teeth 202 that have a relatively small circumference and are oriented at an upward angle of about 45°. Row B of stationary grinding ring 200 has a plurality of generally ovoid grater teeth 204 that have a relatively small circumference and are oriented at a downward angle of about 45°. Row C of stationary grinding ring 200 has a plurality of generally ovoid grater teeth 206 that have a relatively large circumference and are oriented horizontally. Row D of stationary grinding ring 200 has a plurality of grater teeth in an alternating pattern that alternates between generally triangular grater teeth 208 and generally square grater teeth 210. Each of the generally triangular grater teeth 208 and generally square grater teeth 210 are oriented horizontally. Row E of stationary grinding ring 200 has a singular generally rectangular grating tooth 212 that is oriented horizontally. Row F of stationary grinding ring 200 has a plurality of grater teeth in an alternating pattern that alternates between generally square grater teeth 214 and generally triangular grater teeth 216. Each of the generally square grater teeth 214 and generally triangular grater teeth 216 are oriented horizontally.

It should be understood that alternative embodiments of stationary grinding ring 200 could have grater teeth arranged in any combination or pattern of rows A-F. For example, one embodiment of stationary grinding ring 200 could have only repeating rows any one of rows A, B, C, D, E, or F. Another embodiment could have alternating combinations of any or all of rows A-F, including but not limited to: repeating alternating row A and row B; repeating alternating row A, row C, row B, row C; and repeating alternating row D and row E.

Referring back to FIG. 5, the stationary grinding ring 116 may also include at least one diverter 168. Diverter 168 is preferably positioned at a lower edge 140 of the stationary grinding ring 116, and protrudes inwardly from the inner surface 130. As used herein, the term "positioned at" means towards, near or close to, and does not require that any portion of the diverter actually be exactly at or below the lower edge 140 of the stationary grinding ring 116. As illustrated, diverter 168 has a generally domed shape, but diverter 168 can have any suitable shape. Diverter 168 is configured to, upon contact, knock or divert food waste away from the lower edge 140 of the stationary grinding ring 116, so that the food waste can re-seat and continue to be ground by the stationary grinding ring 116. A diverter 168 may prevent food waste, particularly oblong food pieces such as baby carrots, from getting caught and simply spinning along the lower edge 140 of the stationary grinding ring 116.

In order to facilitate mounting and retaining the stationary grinding ring 116 onto the housing 108 within the grinding section 106, the stationary grinding ring 116 may include at least one mounting notch 142. Each mounting notch 142 may be configured to receive a corresponding mounting protrusion (not shown) on the housing 108 within the grinding section 106, such that the stationary grinding ring 116 may be secured to and retained by the housing 108, within the grinding section 106, preferably within an upper portion of the grinding section 106.

Referring back to FIGS. 3 and 4, the housing 108, at the grinding section 106 of the food waste disposer 100, includes a plurality of channels 144 configured to convey comminuted food particles that pass through the slots 134 of the grater teeth 128 from the grinding mechanism 112 to the collection area 122. Each channel 144 can be vertical, or substantially vertical. Each channel 144 can be aligned with one row 138 of grater teeth 128, and positioned to receive comminuted food particles that pass through the slots 134 of the grater teeth 128. Gravity may cause the comminuted food particles that pass through one of the slots 134 of one of the grater teeth 128 to fall through the corresponding channel 144 into the collection area 122.

The grinding mechanism 112 is configured to receive food waste conveyed into the grinding section 106 from the food conveying section 102. The received food waste may fall onto the rotating shredder plate 114. The rotating shredder plate 114 is connected at its center by a connector to the shaft 120, and thus rotates when the motor 117 imparts rotational movement to the shaft 120. Any suitable connector can be used to connect the rotating shredder plate 114 to the shaft 120, such as hex bolt 146 shown in FIG. 4, or connector 148 shown in FIG. 7. The rotating shredder plate 114 also includes at least one lug 162. The rotating shredder plate 114 in the food waste disposer 100 as illustrated rotates in a counter-clockwise direction. It should be understood that in other embodiments, the rotating shredder plate 114 may rotate in a clockwise direction.

The rotating shredder plate 114 is configured to direct the received food waste outwardly as it rotates, so that the food waste is propelled against the stationary grinding ring 116.

Figure 7:
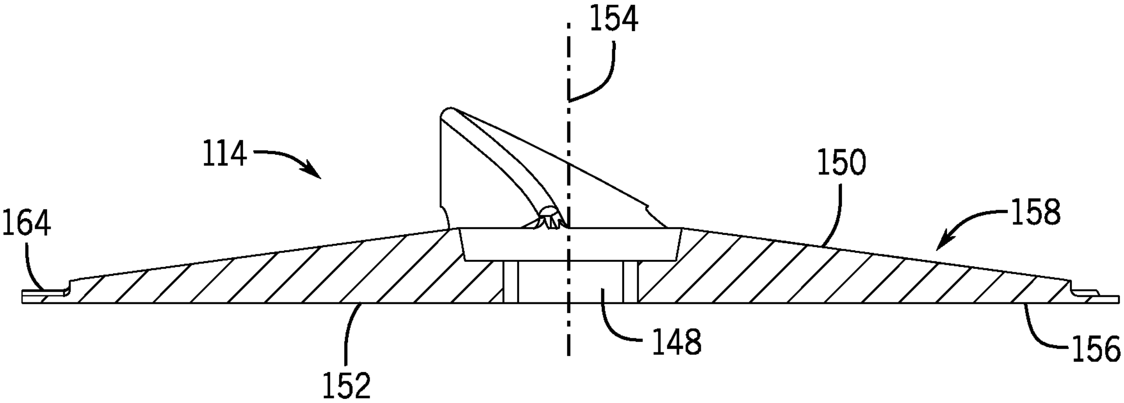
FIG. 7 is a cross sectional view of one example of a rotating shredder plate that can be used in the food waste disposer of FIG. 3.

As shown in FIG. 7, the rotating shredder plate 114 includes a top surface 150, a bottom surface 152, a center 154, and an outer edge 156. The rotating shredder plate 114 is positioned with respect to the stationary grinding ring 116 such that the top surface 150 at the outer edge 156 of the rotating shredder plate 114 is level or substantially level (e.g., it may be slightly above or slightly below) with the lower edge 140 of the stationary grinding ring 116.

The rotating shredder plate 114 may have a cross-section 158 that has a thickness that increases towards the center 154 of the rotating shredder plate 114. For example, the top surface 150 of the rotating shredder plate 114 may slope upwardly from the outer edge 156 towards the center 154. The bottom surface 152 of the rotating shredder plate 114 may be flat, as illustrated, or may be sloped. During operation of the food waste disposer 100, the sloped configuration of the top surface 150 of the rotating shredder plate 114 may facilitate movement of food waste away from the center 154 and towards the outer edge 156 so that the food waste will come in contact with, and be ground by, the stationary grinding ring 116.

As shown in FIG. 4, there may be a gap 160 between the outer edge of the rotating shredder plate 114 and the stationary grinding ring 116. The size of the gap may be dependent upon design considerations, such as tolerance stack, but it is generally preferable for the gap to be small. As shown in FIGS. 4 and 7, the rotating shredder plate 114 may include at least one undercutter 164. The rotating shredder plate 114 may include a plurality of undercutters 164 spaced around its circumference. Each undercutter 164 extends outwardly from the outer edge 156 of the rotating shredder plate 114. The undercutters 164 may be configured to cut food waste that enters the gap 160 between the outer edge of the rotating shredder plate 114 and the stationary grinding ring 116, and may also be configured to further cut food waste that falls through the channels 144. Small pieces of food waste may fall by gravity through the gap 160 into the collection area 122.

FIGS. 8-18 illustrate various examples of rotating shredder plates that can each be used as the rotating shredder plate 114 in food waste disposer 100.

Figure 8:
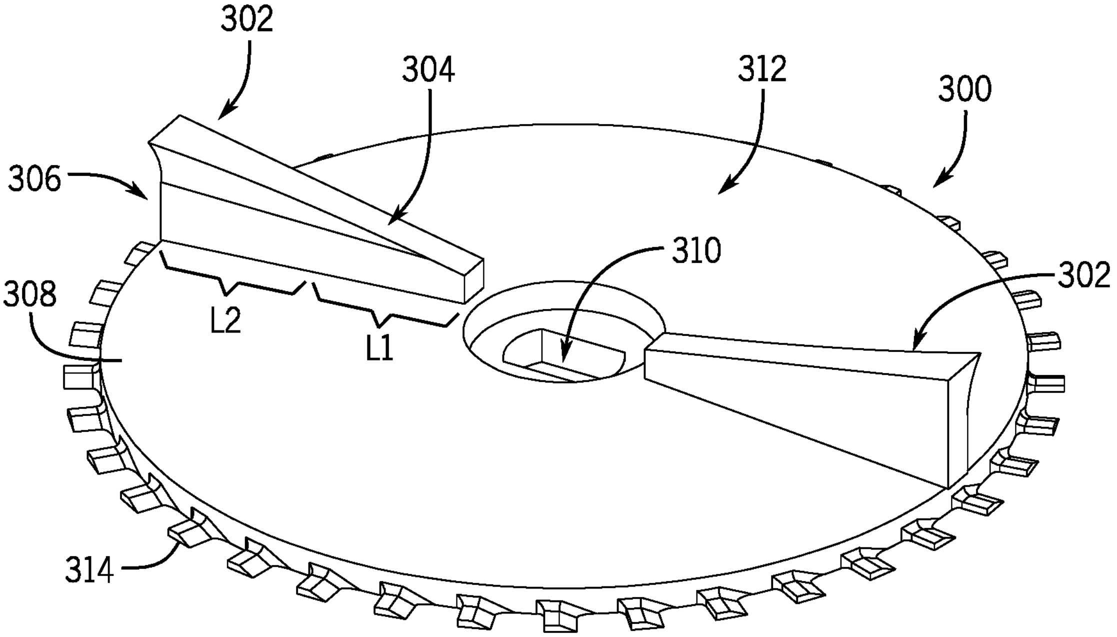
FIG. 8 is a top perspective view of a second example of a rotating shredder plate that can be used in the food waste disposer of FIG. 3.

FIG. 8 illustrates a rotating shredder plate 300, which may be shaped, or have any of the features, as described above with respect to rotating shredder plate 114, or any other example of a rotating shredder plate herein, with the distinction being that rotating shredder plate 300 includes at least one partially affixed lug 302. The rotating shredder plate 300 has an outer edge 308, a center 310 that is configured to be secured to a shaft, such as shaft 120 (FIG. 3), and a top surface 312. The rotating shredder plate 300 may also include at least one, undercutter 314. The rotating shredder plate 300 may include a plurality of undercutters 314. Each undercutter 314 extends outwardly from the outer edge 308.

Two partially affixed lugs 302 are shown in FIG. 8, but it should be understood that one, three, or more partially affixed lugs 302 can be included. Each partially affixed lug 302 has a first end 304 and a second end 306. The first end 304 extends along a first part L1 of the length of the partially affixed lug 302 is closer to the center 310 than the second end 306. The first end 304 is fixedly secured to the top surface 312 of the rotating shredder plate 300. The second end 306 extends along a second part L2 of the length of the partially affixed lug 302 is closer to the outer edge 308 than the first end 304. The second end 306 is not secured to the top surface 312 of the rotating shredder plate 300, and is thus movable with respect to the top surface 312 of the rotating shredder plate 300. Each partially affixed lug 302 may be made of a bendable material, such as rubber or any other suitable bendable material. During operation, the second end 306 may bend when it encounters hard food waste, which may reduce or prevent jamming of the grinding mechanism.

Figure 9:
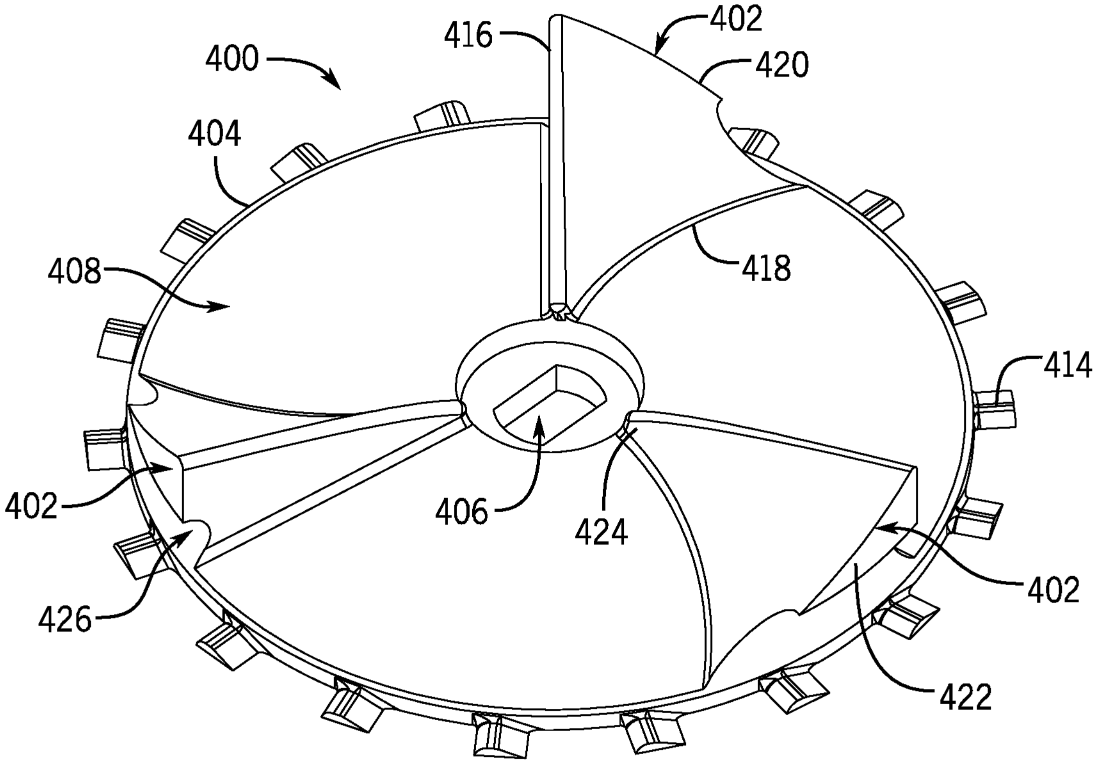
FIG. 9 is a top perspective view of a third example of a rotating shredder plate that can be used in the food waste disposer of FIG. 3.

FIG. 9 illustrates a rotating shredder plate 400, which may be shaped, or have any of the features, as described above with respect to rotating shredder plate 114, or any other example of a rotating shredder plate herein, with the distinction being that rotating shredder plate 400 includes at least one fin shaped lug 402. The rotating shredder plate 400 has an outer edge 404, a center 406 that is configured to be secured to a shaft, such as shaft 120 (FIG. 3), and a top surface 408. The rotating shredder plate 400 may also include at least one, undercutter 414. The rotating shredder plate 400 may include a plurality of undercutters 414 spaced around its circumference. Each undercutter 414 extends outwardly from the outer edge 404.

Three fin shaped lugs 402 are shown in FIG. 9, but it should be understood that one, two or more than three fin shaped lugs 402 can be included. Each fin shaped lug 402 has a leading side 416 and a trailing side 418, the leading and trailing sides being determined with respect to the direction of rotation of the rotating shredder plate 400. Each leading side 416 may be straight or curved, and likewise each trailing side 418 may be straight or curved. Each fin shaped lug 402 also has a radially outward side 422 and a radially inward side 424. Each fin shaped lug 402 has a thickness that decreases from the leading side 416 to the trailing side 418. The thickness may also decrease from the radially outward side 422 to the radially inward side 424.

Figure 11:
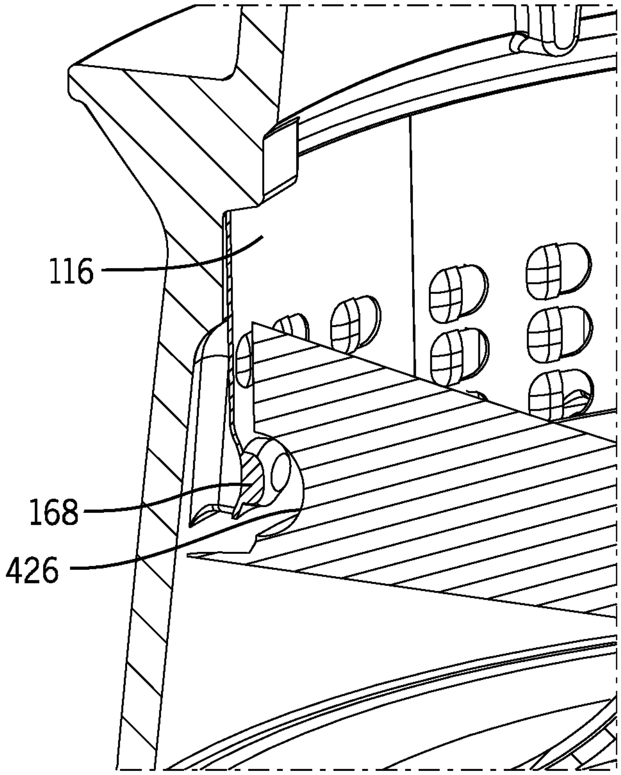
FIG. 11 is a partial cross-sectional view of a grinding mechanism having a rotating shredder plate of FIG. 9 or FIG. 10.

In at least some examples, each fin shaped lug 402 is fixedly attached to the top surface 408 of the rotating shredder plate 400 along the entire length, or substantially the entire length, of the fin shaped lug 402. In such examples where the stationary grinding ring 116 has a diverter 168, each fin shaped lug 402 may have a groove 426 along the radially outward side 422 to accommodate the diverter 168. As shown in FIG. 11, in operation, the groove 426 can be configured to pass over the diverter 168 as the rotating shredder plate 400 rotates during operation.

Figure 10:
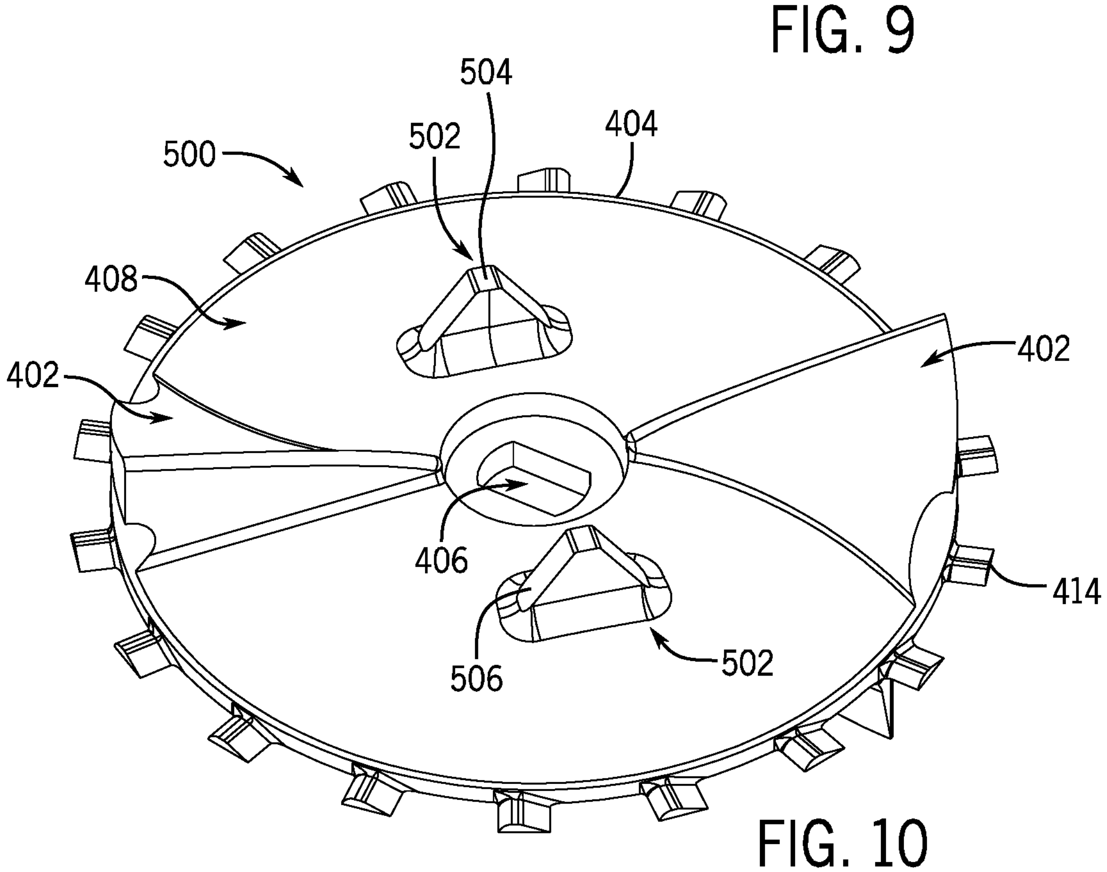
FIG. 10 is a top perspective view of a fourth example of a rotating shredder plate that can be used in the food waste disposer of FIG. 3
Figure 12:
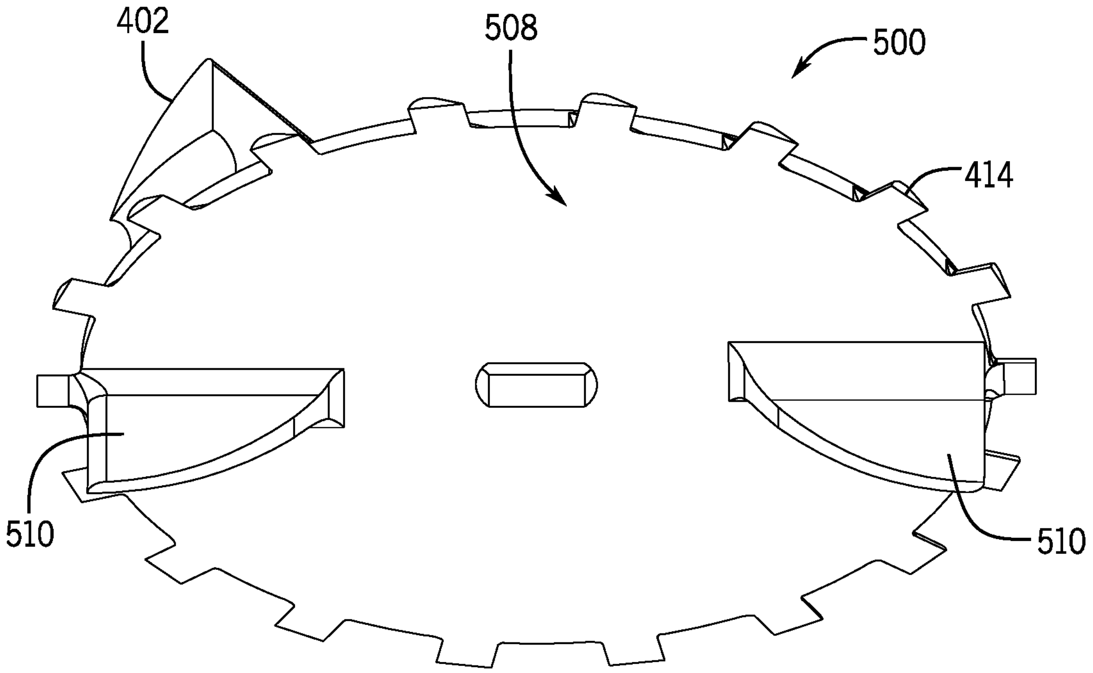
FIG. 12 is a bottom perspective view of a rotating shredder plate of FIG. 10.

FIGS. 10 and 12 illustrates a rotating shredder plate 500, which may be shaped, or have any of the features, as described above with respect to rotating shredder plate 114, or any other example of a rotating shredder plate herein, and is illustrated as having several components that may be similar or identical to components of rotating shredder plate 400 and therefore have like reference numerals. For example, rotating shredder plate 500 includes at least one fin shaped lug 402. Two fin shaped lugs 402 are shown in the example of FIG. 10, but it should be understood that one, three, or more than three fin shaped lugs 402 can be included. Each fin shaped lug 402 of rotating shredder plate 500 can have the same components and features as described with respect to rotating shredder plate 400 shown in FIG. 9. The rotating shredder plate 500 also has an outer edge 404, a center 406 that is configured to be secured to a shaft, such as shaft 120 (FIG. 3), and a top surface 408. The rotating shredder plate 500 may also include at least one, undercutter 414. The rotating shredder plate 500 may include a plurality of undercutters 414 spaced around its circumference. Each undercutter 414 extends outwardly from the outer edge 408.

The rotating shredder plate 500 may also have at least one spike 502. Two spikes 502 are shown, but it should be understood that one, three, or more than three spikes could be used. Each spike 502 can include a peak 504 and at least one sidewall 506 that can be sloped vertical. In the example illustrated in FIG. 10, each spike 502 has the shape of a triangular prism, with two sloped sidewalls and two vertical sidewalls. A spike 502 can have any suitable shape, such as a cone, a triangular prism with all four sidewalls being sloped, or a wedge. Each spike 502 is attached, and may be fixedly attached, to the top surface 408 of the rotating shredder plate 500, and is positioned closer to the center 406 than to the outer edge 404. Each spike 502 is configured to deflect food waste that might otherwise tend to become stuck towards the center of the rotating shredder plate 500, such as citrus halves or slices.

The rotating shredder plate 500 may also have a bottom surface 508 and at least one pumping fin 510 attached to the bottom surface 508. The at least one pumping fin 510 extends downwardly from the bottom surface, into the collection area 122. The at least one pumping fin 510 is configured to stir comminuted food particles and water in the collection area 122 of the food waste disposer 100 during operation, and may facilitate discharge of the comminuted food particles and water through the discharge outlet 126. Two pumping fins 510 are shown in the example of FIGS. 10 and 12, but it should be understood that one, three, or more than three pumping fins 510 can be included.

Figure 13:
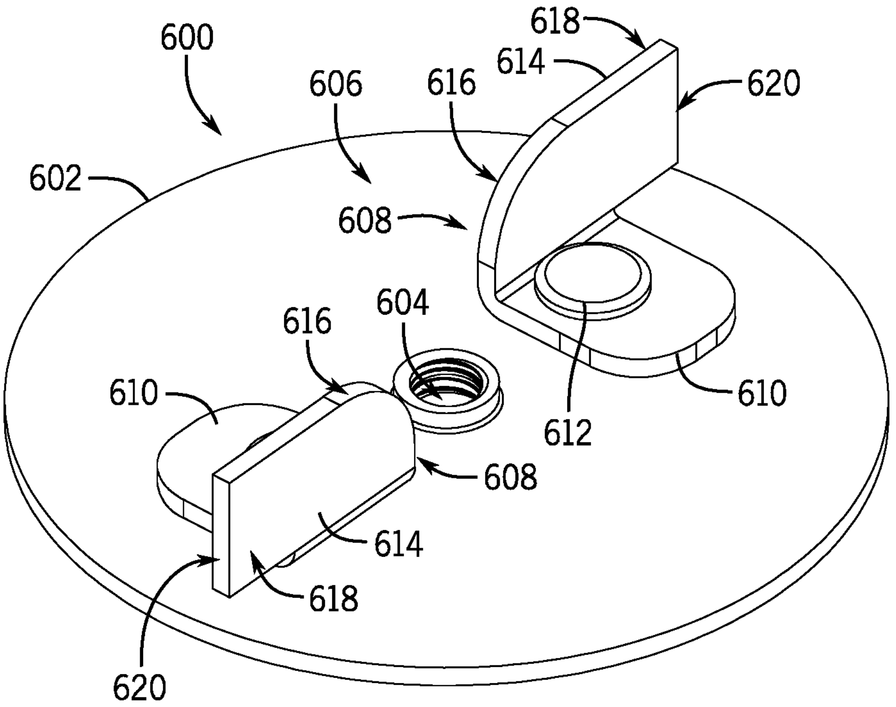
FIG. 13 is a top perspective view of a fifth example of a rotating shredder plate that can be used in the food waste disposer of FIG. 3, in a first position.
Figure 14:
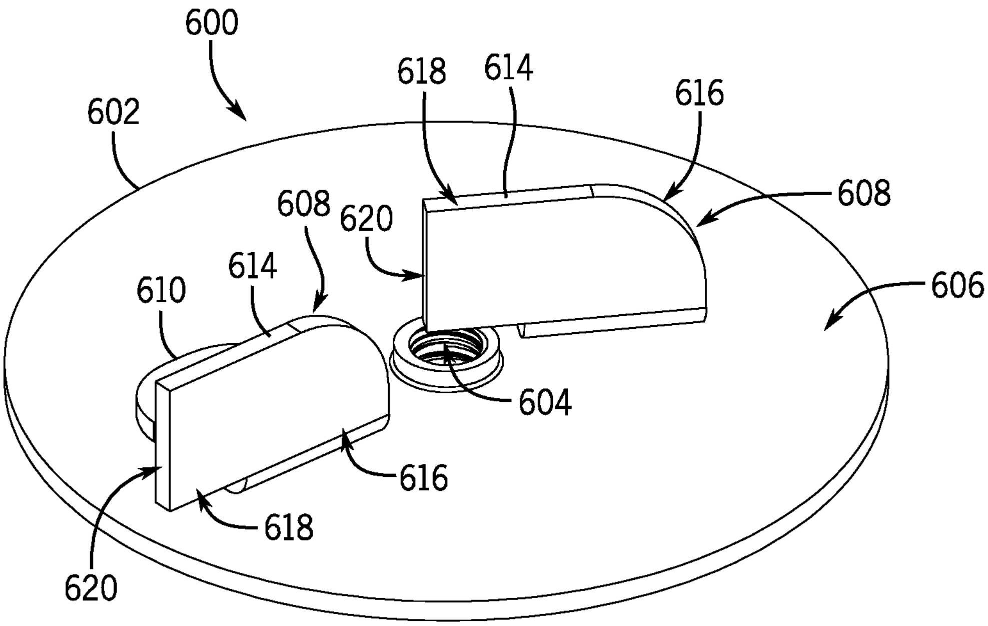
FIG. 14 is a top perspective view of the rotating shredder plate of FIG. 13, in a second position.
Figure 15:
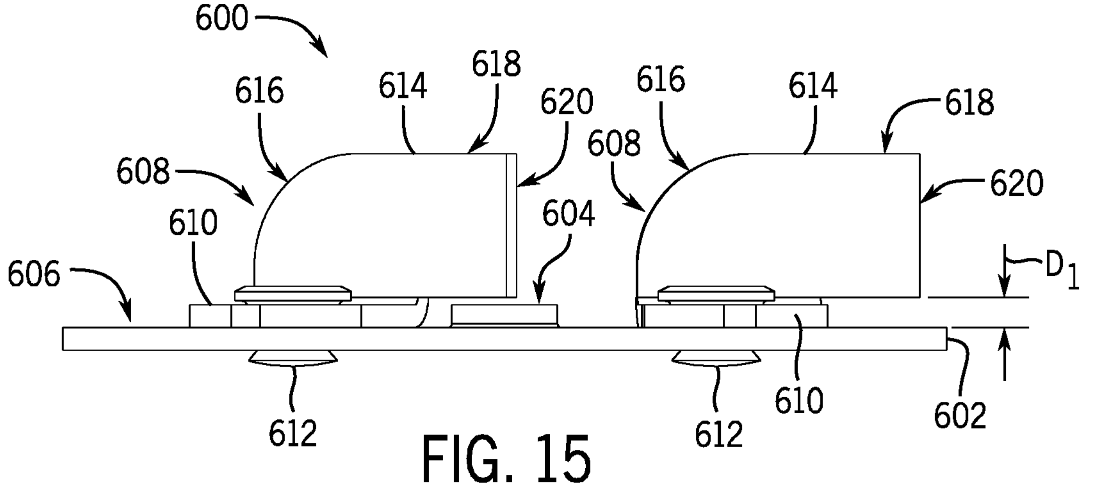
FIG. 15 is a side elevational view of the rotating shredder plate of FIG. 14.

FIGS. 13-15 illustrate a rotating shredder plate 600, which may be shaped, or have any of the features, as described above with respect to rotating shredder plate 114, or any other example of a rotating shredder plate herein, with the distinction being that rotating shredder plate 600 includes at least one lug that is rotatably attached to the rotating shredder plate 600. Rotating shredder plate 600 has an outer edge 602, a center 604 that is configured to be secured to a shaft, such as shaft 120 (FIG. 3), and a top surface 606.

Two rotatably attached lugs 608 are shown in FIGS. 13-15, but it should be understood that one, three, or more rotatably attached lugs 608 can be included. Each rotatably attached lug 608 may have a base 610 that abuts, and may rest on, the top surface 606. Each rotatably attached lug 608 may have a connector 612 that rotatably connects the base 610 to the top surface 606. As shown in FIG. 15, each connector 612 may extend through the rotating shredder plate 600 and function as a rotation point, about which the rotatably attached lug 608 rotates. For example, FIG. 13 shows the rotatably attached lugs 608 in a first position, FIG. 14 shows the rotatably attached lugs 608 in a second position, and FIG. 15 shows the rotatably attached lugs 608 in a third position. Each rotatably attached lug 608 may also have a face plate 614, which may be connected to the base 610 at an angle, such as a 90°. Each face plate 614 may have any suitable shape, such as first end 616 that is curved and a second end 618 that extends towards the outer edge 602 of the rotating shredder plate 600. In this example, the first end 616 of the face plate 614 of each rotatable lug 608 extends from the side of the base 610 that is closest to the center 704 of the rotatable shredder plate 700. The second end 618 may be rectangular or substantially rectangular, or otherwise have a flat edge 620. As shown in FIG. 15, the second end 618 may be spaced above the top surface 606 of the rotating shredder plate 600 by a distance $D_1$. The distance $D_1$ may be large enough that the second end 618 of the face plate 614 can rotate above the center 604 and any structure in located at the center 604 to connect the rotating shredder plate 600 to the shaft 120 (FIG. 3).

Figure 16:
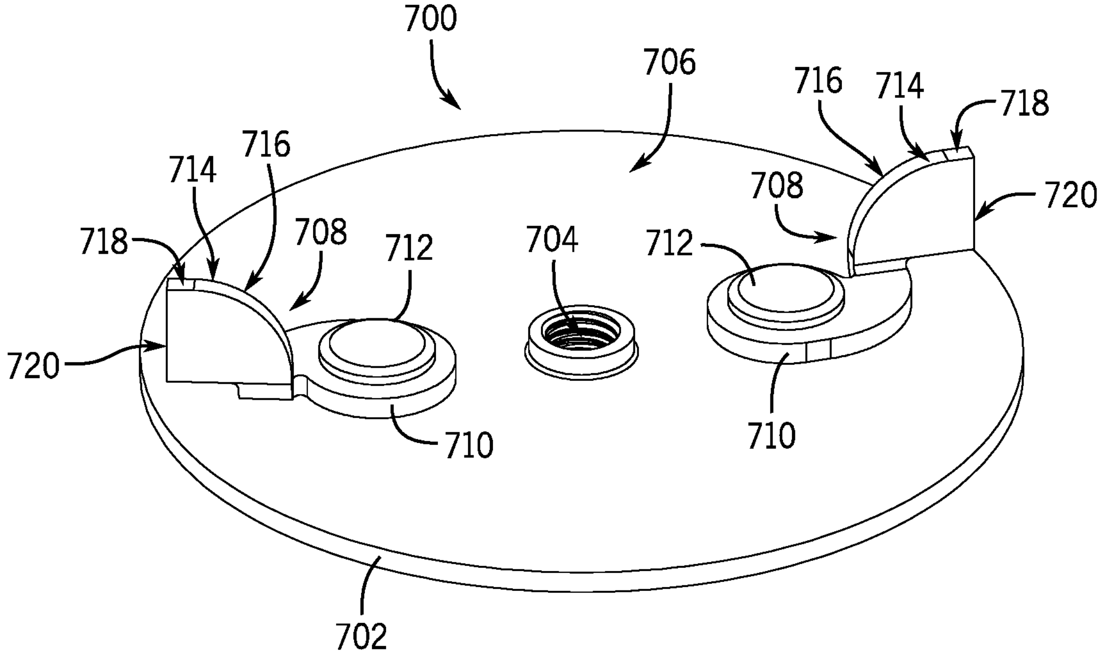
FIG. 16 is a top perspective view of a sixth example of a rotating shredder plate that can be used in the food waste disposer of FIG. 3.

FIG. 16 illustrates a rotating shredder plate 700 that has another example of a rotatably attached lug. The rotating shredder plate 700 may be shaped, or have any of the features, as described above with respect to rotating shredder plate 114, or any other example of a rotating shredder plate herein, and in particular has many features that are similar or identical to the example of FIGS. 13-15, except that the face plate has a different configuration. Rotating shredder plate 700 has an outer edge 702, a center 704 that is configured to be secured to a shaft, such as shaft 120 (FIG. 3), and a top surface 706.

In FIG. 16, two rotatably attached lugs 708 are shown, but it should be understood that one, three, or more rotatably attached lugs 708 can be included. Each rotatably attached lug 708 may have a base 710 that abuts, and may rest on, the top surface 706. Each rotatably attached lug 708 may have a connector 712 that rotatably connects the base 710 to the top surface 706. Each connector 712 may extend through the rotating shredder plate 700 and function as a rotation point, about which the rotatably attached lug 708 rotates. Each rotatably attached lug 708 may also have a face plate 714, which may be connected to the base 710 at an angle, such as a 90°. Each face plate 714 may have any suitable shape, such as first end 716 that is curved and a second end 718 that extends towards the outer edge 602 of the rotating shredder plate 700. In this example, the first end 716 of each face plate 714 of each rotatable lug 708 extends from the side of the base 710 that is closest to the outer edge 702 of the rotatable shredder plate 700, and is thus shorter than the face plate 614 of each rotatable lug 608. The second end 718 may be rectangular or substantially rectangular, or otherwise have a flat edge 720. As shown in FIG. 16, the second end 718 may be spaced above the top surface 706 of the rotating shredder plate 700 by a distance $D_1$. The distance $D_1$ may be large enough that the second end 718 of the face plate 714 can rotate above the center 704 and any structure in located at the center 704 to connect the rotating shredder plate 700 to the shaft 120 (FIG. 3).

Figure 17:
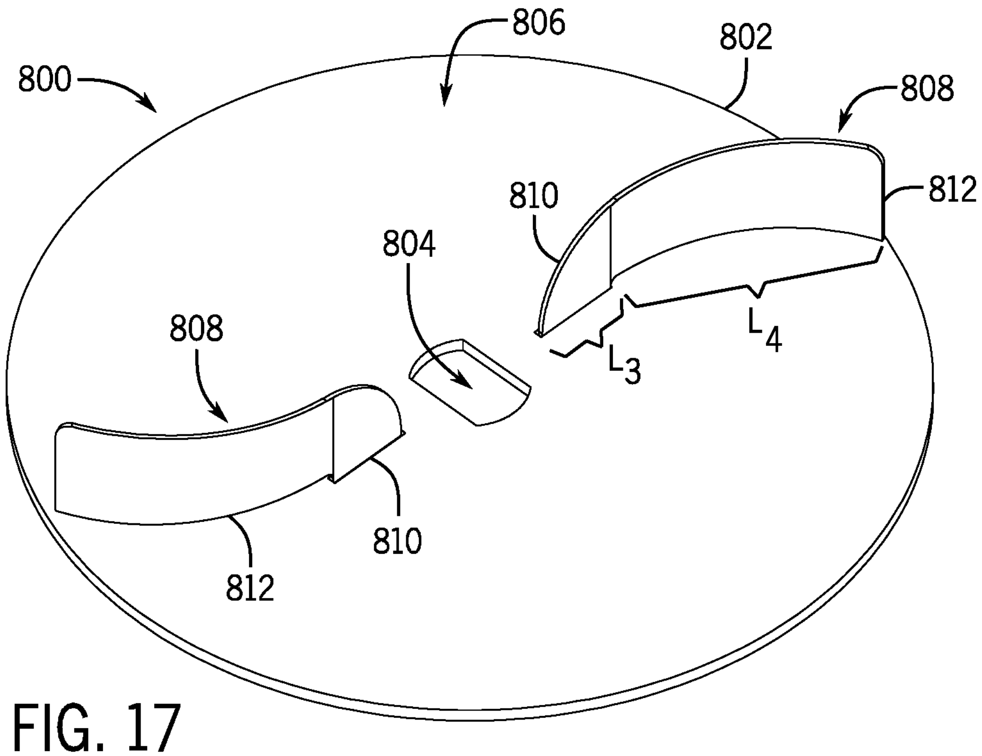
FIG. 17 is a top perspective view of a seventh example of a rotating shredder plate that can be used in the food waste disposer of FIG. 3.
Figure 18:
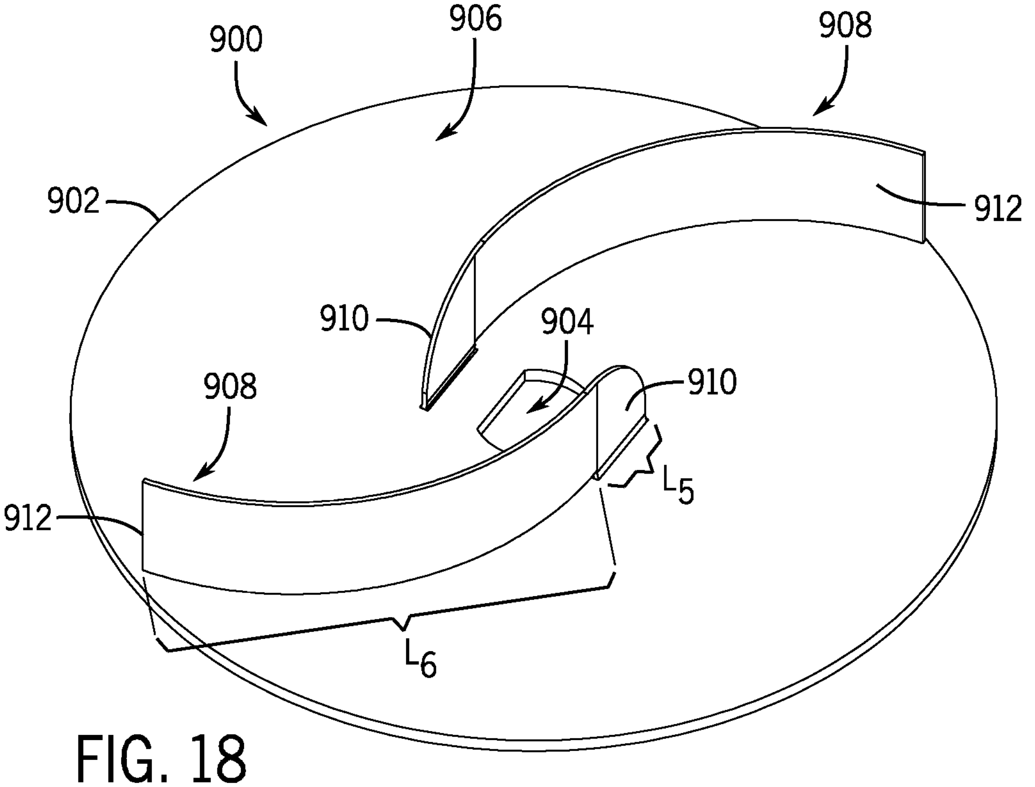
FIG. 18 is a top perspective view of a eighth example of a rotating shredder plate that can be used in the food waste disposer of FIG. 3.

FIGS. 17 and 18 illustrate examples of rotating shredder plates 800 and 900, which each include at least one partially affixed lug, which provide alternative examples of partially fixed lugs as compared to the example shown in FIG. 8.

FIG. 17 illustrates rotating shredder plate 800, which has an outer edge 802, a center 804 that is configured to be secured to a shaft, such as shaft 120 (FIG. 3), and a top surface 806. The rotating shredder plate 800 may be shaped, or have any of the features, as described above with respect to rotating shredder plate 114, or any other example of a rotating shredder plate herein, with the distinction being that rotating shredder plate 800 includes at least one partially affixed lug 808 mounted on the rotating shredder plate 800 spaced away from the center 804 and extending towards the outer edge 802.

Two partially affixed lugs 808 are shown in FIG. 17, but it should be understood that one, three, or more partially affixed lugs 808 can be included. Each partially affixed lug 808 may have any suitable shape, such as a curved shape. Each partially affixed lug 808 has a first end 810 and a second end 812. The first end 810 extends along a first part $L_3$ of the length of the partially affixed lug 808 is closer to the center 804 than the second end 812. The first end 810 is fixedly secured to the top surface 806 of the rotating shredder plate 800. When there are two or more partially affixed lugs 808, such as the two partially affixed lugs 808 shown in FIG. 17, the first ends 810 may be affixed in any suitable orientation with respect to each other. For example, in the orientation shown in FIG. 17, the first ends 810 of the two partially affixed lugs 808 are affixed to the top surface 806 in line with each other. The second end 812 extends along a second part $L_4$ of the length of the partially affixed lug 808 is closer to the outer edge 802 than the first end 810. The second end 812 is not secured to the top surface 806 of the rotating shredder plate 800, and is thus movable with respect to the top surface 806 of the rotating shredder plate 800. Each partially affixed lug 808 may be made of a bendable material, such as spring steel or any other suitable bendable material. During operation, the second end 812 of each partially affixed lug 808 may bend when it encounters hard food waste, which may reduce or prevent jamming of the grinding mechanism.

FIG. 18 illustrates rotating shredder plate 900, which has an outer edge 902, a center 904 that is configured to be secured to a shaft, such as shaft 120 (FIG. 3), and a top surface 906. The rotating shredder plate 900 may be shaped, or have any of the features, as described above with respect to rotating shredder plate 114, or any other example of a rotating shredder plate herein, with the distinction being that rotating shredder plate 900 includes at least one partially affixed lug 908 mounted on the rotating shredder plate 900 spaced away from the center 904 and extending towards the outer edge 902.

Two partially affixed lugs 908 are shown in FIG. 18, but it should be understood that one, three, or more partially affixed lugs 908 can be included. Each partially affixed lug 908 may have any suitable shape, such as a curved shape. Each partially affixed lug 908 has a first end 910 and a second end 912. The first end 910 extends along a first part $L_5$ of the length of the partially affixed lug 908 is closer to the center 904 than the second end 912. The first end 910 is fixedly secured to the top surface 906 of the rotating shredder plate 900. When there are two or more partially affixed lugs 908, such as the two partially affixed lugs 908 shown in FIG. 18, the first ends 910 may be affixed in any suitable orientation with respect to each other. For example, in the orientation shown in FIG. 18, the first ends 910 of the two partially affixed lugs 908 are affixed to the top surface 906 in parallel with each other. The second end 912 extends along a second part $L_6$ of the length of the partially affixed lug 908 is closer to the outer edge 902 than the first end 910. The second end 912 is not secured to the top surface 906 of the rotating shredder plate 900, and is thus movable with respect to the top surface 906 of the rotating shredder plate 900. Each partially affixed lug 908 may be made of a bendable material, such as spring steel or any other suitable bendable material. During operation, the second end 912 of each partially affixed lug 908 may bend when it encounters hard food waste, which may reduce or prevent jamming of the grinding mechanism.

In each of the examples of rotating shredder plates provided herein, the lugs may extend above the top surface of the rotating shredder plate by any suitable amount, which may, at its tallest point, be equal to or less than the height $H_1$ of the grater ring shown in FIG. 5. In at least one example, the second end of each lug, which is the end closest to the grater ring, may extend above the top surface of the rotating shredder plate an amount equal, or substantially equal, to the height $H_2$ of any row or grater teeth.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A food waste disposer comprising:
- a housing bounding:
  - a food conveying section;
  - a motor section comprising a motor that rotates a shaft;
  - a grinding section located between the food conveying section and the motor section,
- a grinding mechanism within the grinding section, the grinding mechanism comprising:
  - a stationary grinding ring including a plurality of rows of grater teeth, wherein each row of grater teeth has at least one grater tooth; and
  - a rotating shredder plate attached to the shaft, the rotating shredder plate including at least one lug, wherein the at least one lug of the rotating shredder plate includes at least one partially affixed lug, the at least one partially affixed lug comprising:
  - a first end that extends along a first part of a length of the partially affixed lug and is fixedly secured to a top surface of the rotating shredder plate; and
  - a second end that extends along a second part of the length of the partially affixed lug and is movable with respect to the top surface of the rotating shredder plate.

2. The food waste disposer of claim 1, wherein each grater tooth comprises:
- a slot that provides an opening that passes through the stationary grinding ring from an inner surface of the stationary grinding ring to an outer surface of the stationary grinding ring; and
- a raised cutting edge that protrudes inwardly from the inner surface of the stationary grinding ring.

3. The food waste disposer of claim 1, wherein, at the grinding section, the housing includes a channel aligned with each row of grater teeth.

4. The food waste disposer of claim 1, wherein the stationary grinding ring further comprises a diverter positioned at a lower edge of the stationary grinding ring.

5. The food waste disposer of claim 1, wherein the rotating shredder plate has a cross-section that has a thickness that increases towards a center of the rotating shredder plate.

6. The food waste disposer of claim 1, wherein the rotating shredder plate is positioned with respect to the stationary grinding ring such that a top surface at the outer edge of the rotating shredder plate is substantially level with a lower edge of the stationary grinding ring.

7. The food waste disposer of claim 1, wherein the rotating shredder plate further comprises at least one undercutter that extends outwardly from an outer edge of the rotating shredder plate.

8. The food waste disposer of claim 1, wherein the at least one lug of the rotating shredder plate includes at least one fin shaped lug that includes a leading side, a trailing side, a radially outward side, a radially inward side, and a thickness that decreases from the leading side to the trailing side and also decrease from the radially outward side to the radially inward side.

9. The food waste disposer of claim 1, wherein the rotating shredder plate further comprises at least one spike, the at least one spike that includes a peak and at least one sidewall, and that is positioned closer to a center of the rotating shredder plate than to an outer edge of the rotating shredder plate.

10. The food waste disposer of claim 1, wherein the rotating shredder plate further comprises a bottom surface and at least one pumping fin attached to and extending downwardly from the bottom surface.

11. A grinding mechanism for a food waste disposer, the grinding mechanism comprising:
- a stationary grinding ring including a plurality of rows of grater teeth, wherein each row of grater teeth has at least one grater tooth; and
- a rotating shredder plate including at least one lug;
- wherein the at least one lug of the rotating shredder plate includes at least one partially affixed lug, the at least one partially affixed lug comprising:
  - a first end that extends along a first part of a length of the partially affixed lug and is fixedly secured to a top surface of the rotating shredder plate; and
  - a second end that extends along a second part of the length of the partially affixed lug and is movable with respect to the top surface of the rotating shredder plate.

12. The grinding mechanism of claim 11, wherein each grater tooth comprises:
- a slot that provides an opening that passes through the stationary grinding ring from an inner surface of the stationary grinding ring to an outer surface of the stationary grinding ring; and
- a raised cutting edge that protrudes inwardly from the inner surface of the stationary grinding ring.

13. The grinding mechanism of claim 11, wherein the stationary grinding ring further comprises a diverter positioned at a lower edge of the stationary grinding ring.

14. The grinding mechanism of claim 11, wherein the rotating shredder plate has a cross-section that has a thickness that increases towards a center of the rotating shredder plate.

15. The grinding mechanism of claim 11, wherein the rotating shredder plate is positioned with respect to the stationary grinding ring such that a top surface at the outer edge of the rotating shredder plate is substantially level with a lower edge of the stationary grinding ring.

16. The grinding mechanism of claim 11, wherein the rotating shredder plate further comprises a bottom surface and at least one pumping fin attached to and extending downwardly from the bottom surface.

17. The grinding mechanism of claim 11, wherein the rotating shredder plate further comprises at least one spike, the at least one spike that includes a peak and at least one sidewall, and that is positioned closer to a center of the rotating shredder plate than to an outer edge of the rotating shredder plate.

18. A food waste disposer comprising:
- a housing bounding:
  - a food conveying section;
  - a motor section comprising a motor that rotates a shaft;
  - a grinding section located between the food conveying section and the motor section,
- a grinding mechanism within the grinding section, the grinding mechanism comprising:
  - a stationary grinding ring including a plurality of rows of grater teeth, wherein each row of grater teeth has at least one grater tooth; and
  - a rotating shredder plate attached to the shaft, the rotating shredder plate including at least one lug, wherein the at least one lug of the rotating shredder plate includes at least one fin shaped lug that includes a leading site, a trailing side, a radially outward side, a radially inward side, and a thickness that decreases from the leading side to the trailing side and also decrease from the radially outward side to the radially inward side.

19. The food waste disposer of claim 18, wherein the rotating shredder plate further comprises at least one under-cutter that extends outwardly from an outer edge of the rotating shredder plate.

20. The food waste disposer of claim 18, wherein the rotating shredder plate further comprises at least one spike, the at least one spike that includes a peak and at least one sidewall, and that is positioned closer to a center of the rotating shredder plate than to an outer edge of the rotating shredder plate.

* * * * *